United States Patent [19]

Johnson

[11] E Patent Number: Re. 32,722

[45] Reissued Date of Patent: Aug. 2, 1988

[54] VENTILATION SYSTEM WITH THERMAL ENERGY RECOVERY

[75] Inventor: Arthur C. W. Johnson, Troy, Mich.

[73] Assignee: Combustion Research Corp., Pontiac, Mich.

[21] Appl. No.: 693,539

[22] Filed: Jan. 22, 1985

Related U.S. Patent Documents

Reissue of:

[64] Patent No.: 4,049,404
Issued: Sep. 20, 1977
Appl. No.: 600,620
Filed: Jul. 31, 1975

[51] Int. Cl.[4] ..... B01D 53/04

[52] U.S. Cl. ..... 55/387; 55/475; 55/499

[58] Field of Search ..... 55/34, 162, 163, 179, 55/208, 283, 387, 388, 475, 496, 497, 499; 210/490; 98/33.1, 39.1, 40.04, 41.2; 137/875; 236/44 C, 91 C; 251/250, 30 S

[56] References Cited

U.S. PATENT DOCUMENTS

| | | | |
|---|---|---|---|
| 1,409,520 | 3/1922 | Bird | 98/33.1 X |
| 1,872,783 | 8/1932 | Miller | 55/162 |
| 2,101,555 | 12/1937 | Moore et al. | 55/162 |
| 2,248,225 | 7/1941 | Fonda | 55/162 |
| 2,344,384 | 3/1944 | Altenkirch | 55/162 |
| 2,561,441 | 7/1951 | Lou | 55/163 |
| 2,856,131 | 10/1958 | Conlan | 251/250 X |
| 2,862,434 | 12/1958 | Edwards | 98/33.1 |
| 2,949,976 | 8/1960 | Tuthill | 55/283 X |
| 2,974,921 | 3/1961 | Kaswan | 251/250 X |
| 3,354,808 | 11/1967 | Macrow | 98/40.04 |
| 3,397,793 | 8/1968 | MacDonnell | 210/490 X |
| 3,592,221 | 7/1971 | Worley et al. | 137/875 X |
| 3,594,986 | 7/1971 | Schmid | 55/162 X |
| 3,782,081 | 1/1974 | Munters | 55/388 X |
| 3,847,210 | 11/1974 | Wells | 251/250 X |

FOREIGN PATENT DOCUMENTS

| | | | |
|---|---|---|---|
| 699,218 | 11/1953 | United Kingdom | 55/162 |

*Primary Examiner*—Robert Spitzer
*Attorney, Agent, or Firm*—Krass & Young

[57] ABSTRACT

A high performance ventilation system with [means] *provisions* for recovering a high percentage of sensible and latent thermal energy from the exhausted air for return via the supply air. Two matrices of thermally absorbent, expanded honeycomb material are respectively alternately interconnected with fan-driven supply and exhaust paths via a valve device to store energy in one matrix while retrieving energy from the other. Constant air flow direction is maintained in the ventilated area. The valve may be thermostat controlled. The matrices are preferably formed of a fibrous organic material such as paper, in an expandable honeycomb configuration, and resin impregnated for durability and strength. A degree of residual flexibility is desired whereby the matrices may be adjusted for fitting, air control and cleaning purposes.

7 Claims, 3 Drawing Sheets

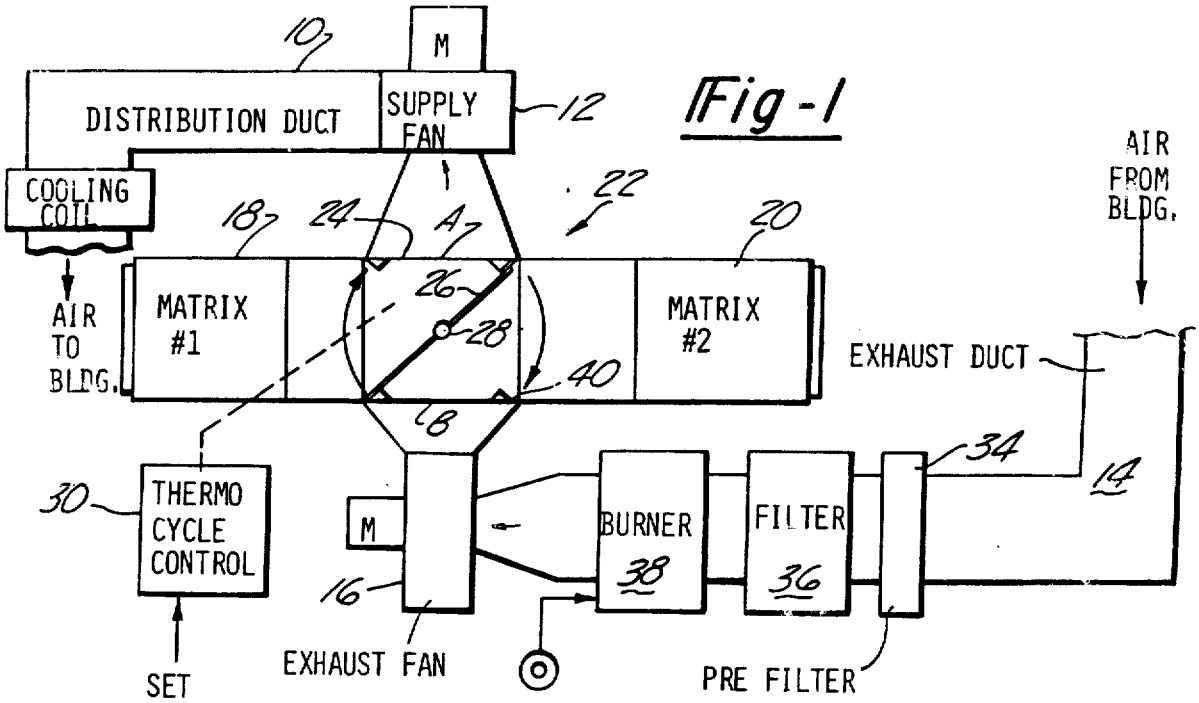
Fig-1
Fig-2
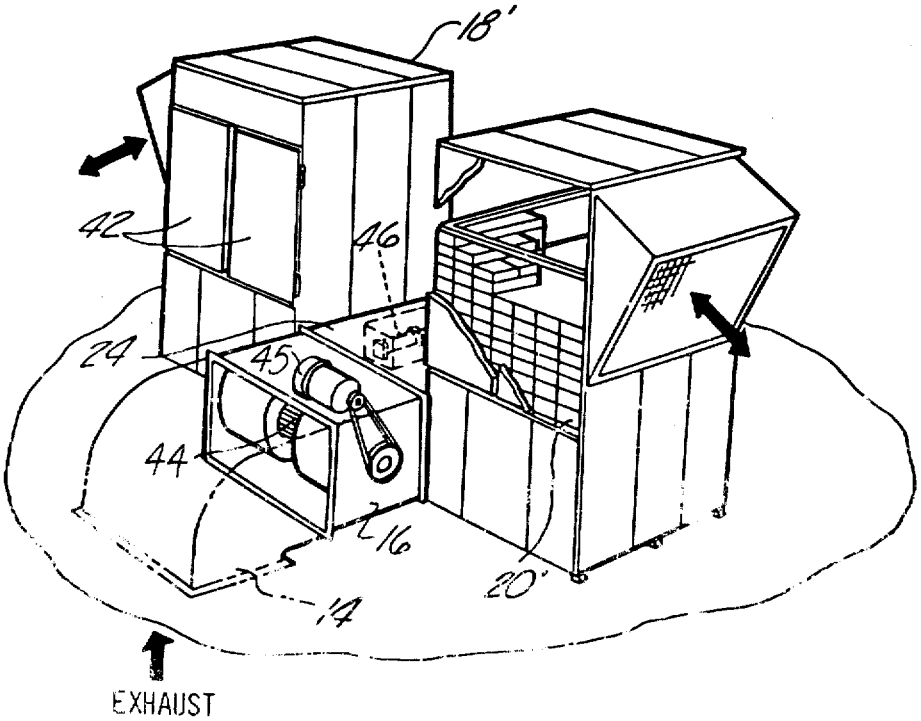

Fig-3
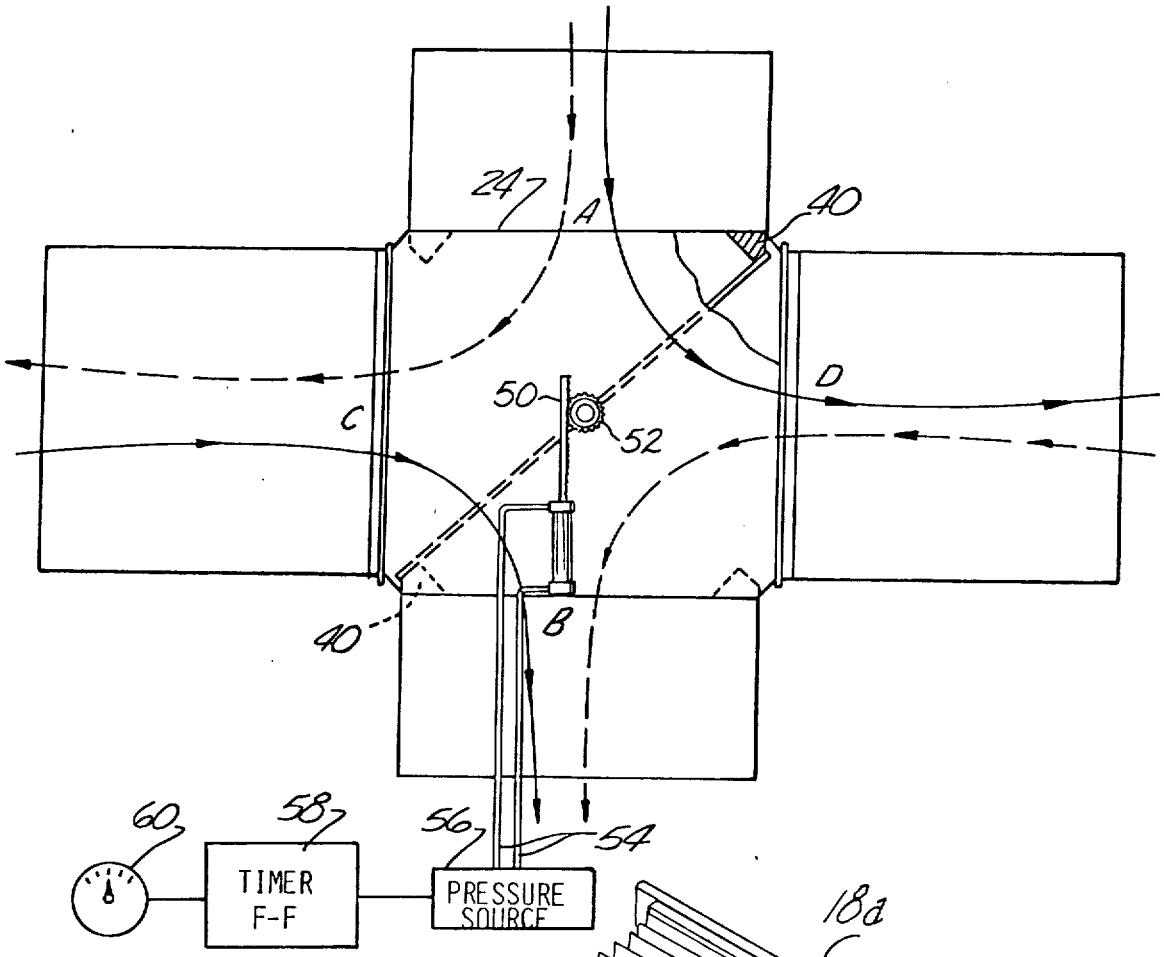
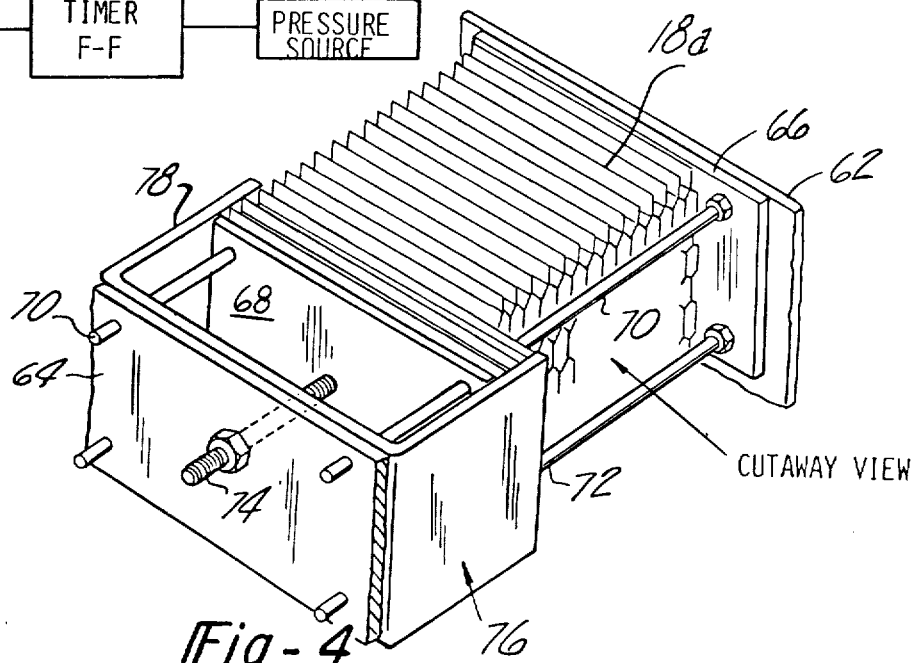
Fig-4

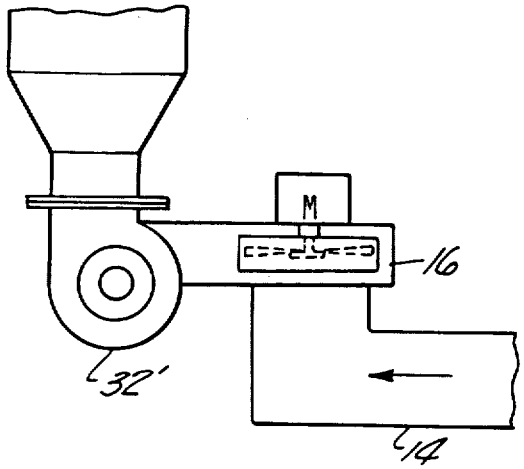
Fig-1a
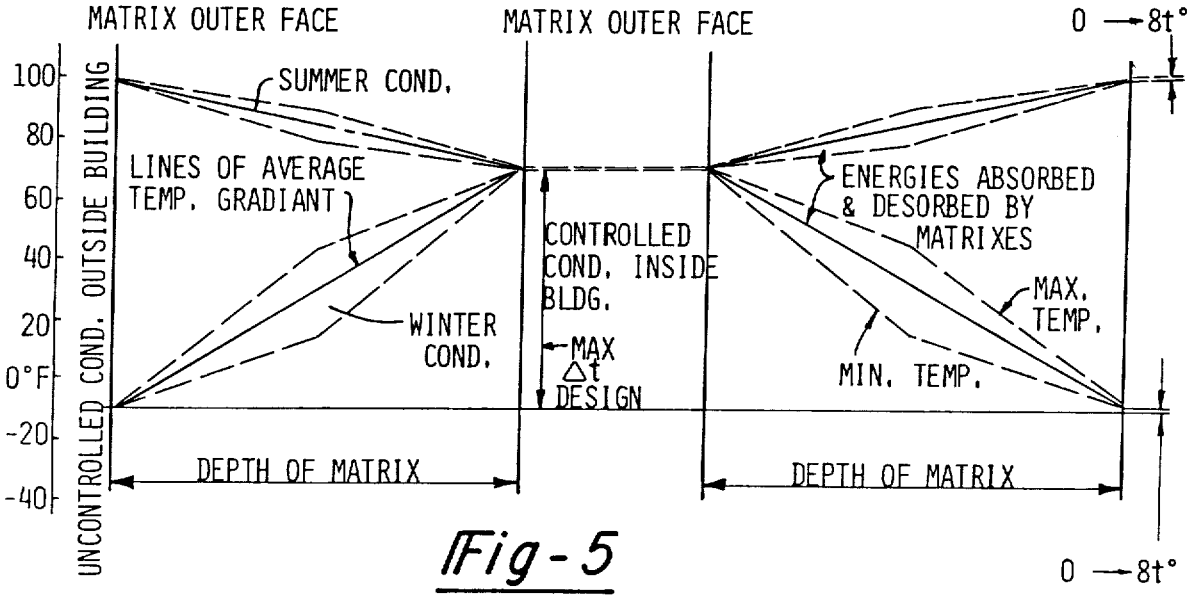
Fig-5
Fig-6
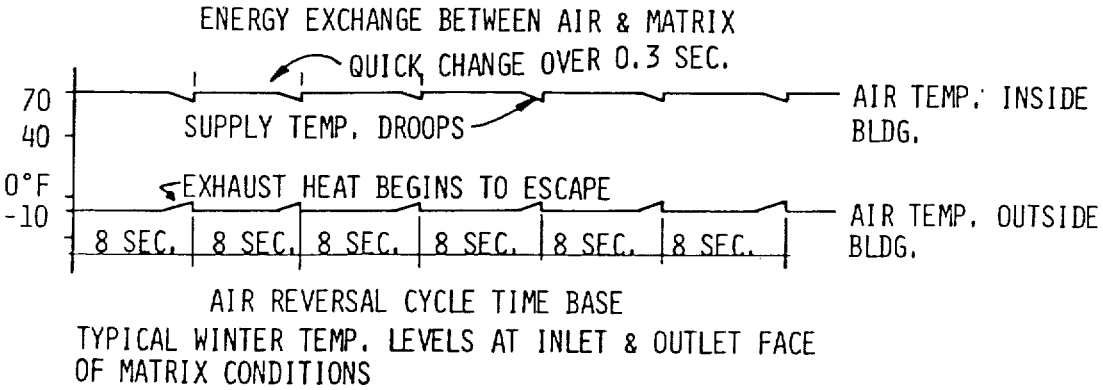

VENTILATION SYSTEM WITH THERMAL ENERGY RECOVERY

Matter enclosed in heavy brackets [ ] appears in the original patent but forms no part of this reissue specification; matter printed in italics indicates the additions made by reissue.

INTRODUCTION

This invention relates to high performance ventilation systems and particularly to a ventilation system having the capability of recovering a high percentage of the thermal energy in the air exhausted from the ventilated area.

BACKGROUND OF THE INVENTION

Ventilating systems are commonly used to maintain environmental standards in industrial, commercial and farming facilities, such as foundries, factories, metal finishing areas, work shops, service areas, warehouses, meeting halls, recreational buildings, animal nursery and feeder houses, and other facilities of many diverse types. Ventilation systems for such facilities are necessary to remove excess heat, discharge pollutants and to maintain a healthful, comfortable environment. Unfortunately, safety, health and economic considerations are at odds with one another in that air which has been heated or cooled at substantial expense is virtually thrown away by the conventional ventilation process. In the case of a heated facility, the exhaust air of the ventilation process contains not only the sensible energy expended in increasing the supply air temperature but the latent energy represented by the vaporized water required to adequately humidify. With great pressure on power-producing utilities and the ever-increasing cost of fuels for heating and cooling, there is a great need to recover thermal energy from the exhaust air of all high performance ventilation systems.

One approach to thermal energy recovery in ventilation systems involves the use of a heat exchanger through which exhaust air is passed in one direction and supply air is passed in the opposite direction. Prior art systems using this approach produces a periodic reversal of air flow direction; this results in a quantity of trapped exhaust air which is returned to the ventilated area during each cycle of operation. Moreover, reversed-flow systems are not compatible with standard vent location technology; i.e., high level exhaust and low level supply.

A non-reversing flow system is made possible through the use of a rotating wheel heat exchanger as well as by non-rotating cross-flow heat exchangers. Prior art heat exchangers of these types have been constructed from metals such as stainless steel, and from certain ceramics such as aluminum oxide and silicon carbide. Such materials, while structurally sound, are expensive and have little or no capability of storing and releasing moisture.

BRIEF SUMMARY OF THE INVENTION

The subject invention provides a low-cost high-performance ventilation system capable of supplying air to and exhausting air from a thermally controlled area in a unidirectional flow pattern while at the same time recovering an extremely high percentage of thermal energy, both sensible and latent, from the exhausted air. Accordingly, the invention makes possible a unit of low initial cost which can be offset in fuel savings in a very short time, in which waste heat such as from lighting, motors and like devices is utilized, and in which a unidirectional flow pattern through the work area maintains desired temperatures from floor to ceiling.

In general, these objectives are accomplished by means of a ventilation system having separate supply and exhaust paths communicable through controlled valve means to first and second thermally absorbent matricies whereby, during one-half cycle of operation, air is exhausted from the building through one matrix while supply air passes through the other matrix and, during the other half-cycle of operation, exhaust air is caused to pass through the second of the above-mentioned matricies while the supply air passes through the first; exhaust and supply air ducts having separate power means which operate in constant flow direction.

A second feature of the invention is the use of a low cost, regulable valve mechanism which, although cyclical in operation, provides a continuous direction of exhaust and supply air flow in the thermally controlled area. In general, this is accomplished by means of a valve housing having four ports, two of the ports being connected to the respective thermally absorbent matrices, the other two ports being connected to independently powered supply and exhaust ducts, and a vane-type baffle which may be caused to pivot over a 90° travel, either back and forth or stepwise, to connect the supply and exhaust ducts to opposite matrices in a cyclical fashion. The flow reversal through each matrix produces a temperature gradient between the faces of the matrix, flow reversal cycle time being kept short to limit such gradient, and to permit matrix size to be kept small and economical.

A still further feature of the invention is the provision of a matrix material which is economical, readily available, produces a low pressure drop, exhibits small hydraulic mean diameters and lineal passages which avoid dirt build-up and clogging, and which has the further capability of absorbing substantial quantities of both sensible and latent heat. In general, this is accomplished through the use of a matrix having a large surface area to volume ratio and which is constructed of a fibrous organic material such as common construction grade paper. In the preferred form the matrix is fabricated in the form of an under-expanded resin-coated paper honeycomb unit defining a large number of parallel common-wall flow paths of small hydraulic mean diameter. The use of the under-expanded paper honeycomb structure provides the significant advantages of good heat transfer, low pressure drop, non-clogging, flexibility and expandability. The matrix units may be fabricated as cartridges which, in the storage condition, occupy a small volume and which may, upon installation, be expanded to operating volume by a simple installation process. A typical installation hereinafter described may be roof-top located with full access doors on both sides of matrix boxes for removal and/or cleaning of matrix sections using sprays or wash-down cycles as hereinafter described.

A still further feature of the invention is the provision of a matrix cartridge useable in combination with a flexible expandable honeycomb structure matrix which permits the gradual expansion of the matrix to provide increased flow area and reduced pressure drop over expected matrix life and which further permits a simple, in-place cleaning process capable of dislodging contaminant particles from the matrix surface. In general, this is accomplished by means of the use of an under-expanded resin-coated honeycomb type paper matrix cartridge adapted to be disposed in a duct or box and further comprising adjustment means for: (a) adjusting the lateral dimension of the matrix across the flow path, and (b) the rapid and violent expansion and compression of the matrix material for impact-type cleaning purposes.

Still further features and advantages of the invention will become apparent from a reading of the following specification in which a specific embodiment of the invention is described in considerable detail.

BRIEF DESCRIPTION OF THE DRAWINGS

FIG. 1 is a plan view of a high performance ventilating system incorporating the invention;

FIG. 1a is a plan view of an alternative system arrangement;

FIG. 2 is a perspective view of the roof-top apparatus in a typical installation of the system of FIG. 1;

FIG. 3 is a detail drawing of a cyclical valving arrangement;

FIG. 4 is a detail drawing of a matrix cartridge arrangement having the adjustment and cleaning features previously described;

FIG. 5 is a graphical illustration of temperature gradient and energy absorption and desorption for typical matrices; and, FIG. 6 is a graphical illustration of a matrix time-temperature cycle.

DETAILED DESCRIPTION OF THE SPECIFIC EMBODIMENT

Referring to FIG. 1 there is shown a high performance ventilating system for an enclosed area identified in the drawing as a building. This may be any type of building or other defined area but is most likely to be an industrial facility such as a foundry, factory or a specific portion of a factory; e.g., a chemical processing area. The ventilating system of FIG. 1 comprises a fixed distribution duct 10 connected to a motor driven supply fan 12 to furnish clean air to the building at some predetermined volumetric rate and at a level and location within the building which provides for comfortable and efficient thermal effect; i.e., heating or cooling. The ventilation system further comprises an exhaust duct 14 connected to a motor driven exhaust fan 16 and fixed within the building at a location and level which provides for the efficient exhausting of old and/or contaminated air. In the case of a heated building having pollutant contaminated air, the exhaust duct 14 is preferably located near the ceiling to recover substantially all pollutated and thermally loaded air which has risen from the lower levels. Note that this air is loaded not only with heat which has been provided by a primary heating source but also heat given off by such secondary sources as lighting, welding machines, motors, etc. Such heat represents not only wasted energy, but also has a deleterious effect on electrical fixtures and wiring due to the high ambient temperature and high humidity conditions which are created near ceiling levels.

The ventilation system of FIG. 1 further comprises first and second thermally absorbent matrices 18 and 20 which are adapted to assume cyclically complemental roles; i.e., thermal energy is absorbed by one matrix at the same time it is desorbed from the other matrix. When the cycle advances, the roles of the matrices 18 and 20 reverse as hereinafter described in greater detail. The cyclical interconnections of the ducts 10 and 14 with the matrices 18 and 20 is controlled by means of a valve structure 22 comprising a housing 24 having four ports A, B, C, and D. Housing 24 containing a large blade-type vane 26 mounted on central pivot 28 and shiftable back-and-forth through 90° swings under the control of the cycle control unit 30 hereinafter described in greater detail with reference to FIG. 3. In the illustrated position, vane 26 connects distribution duct 10 to matrix 18 and exhaust duct 14 to matrix 20 whereby fresh air is drawn into the building through matrix 18 by supply of fan 12 and spent air is exhausted outwardly through matrix 20 by exhaust fan 16. In the alternate setting, 90° from the setting of vane 26 shown in FIG. 1, duct 10 is connected to matrix 20 to draw fresh air therethrough while exhaust duct 14 is connected to matrix 18 to exhaust spent air therethrough.

The apparatus of FIG. 1 further comprises means for appropriately treating the exhaust air prior to passing through the particular matrix to which the position of vane 26 may connect it at any particular time in the cycle of operation. The apparatus comprises a mechanical prefilter 34 of the fibermesh type commonly associated with household forced-air heating systems. Filter 34 is followed by a fine filter 36 such as a "Dri Pack" filter for removing finer solid material. The exhaust is then caused to pass through a section of duct containing a burner unit 38 which may be thermostatically controlled to supply heat to the building as required. Burner 38 may be oil or gas fired to heat the exhaust air entering the matrix. This has the advantage of positively and directly exhausting contaminating combustion products while at the same time efficiently adding such heat as may be necessary to make up for conduction losses. Thus, the safety of continuous ventilation is provided along with efficient heating.

In a typical example of operation, distribution duct 10 is disposed approximately 15 feet above floor level in a building to be ventilated while exhaust duct 14 is disposed at ceiling level. Supply fan 12 and exhaust fan 16 are constantly energized to cause a continuous flushing of air through the building to be ventilated. Cycle control 30 is set to continuously reposition the vane 26 between that position shown in FIG. 1 and a second position at 90° to that shown; the cycle of this pivotal displacement of vane 26 being variable according to the temperature difference between the air in the building and ambient or outside air. By way of example, a maximum inside/outside temperature difference may call for a dwell time between position shifts of 5 to 10 seconds whereas a very small inside/outside temperature difference may require a shift of vane 26 every 10 to 20 seconds depending upon matrix size, air volume, and other factors hereinafter described. Longer vane dwell times may simply over saturate the matrices, reducing system efficiency for energy recovery.

Assuming a temperature gradient between inside and outside air of 50° F. with the inside temperature being the higher, vane 26 is first positioned as shown to cause fresh air to be drawn through matrix 18 from outside the building, through ports C and A, supply fan 12 and distribution duct 10 to the interior of the building. Simultaneously, exhausted air is drawn from the upper regions of the building into duct 14, through filters 34 and 36, past burner 38 where make-up heat is periodically added according to the setting of a conventional in-plant thermostat 33, through exhaust fan 16, ports B and D and through matrix 20. As the exhausted and energy-loaded air passes through matrix 20, sensible heat is absorbed by the physical structure of the matrix due to the high surface area and geometric arrangement thereof. In addition, matrix 20 absorbs latent heat in the form of moisture injected into the air by the standard humidification process and/or from the operation of burner 38, the products of combustion being well known to contain substantial moisture. At the end of the first half cycle of operation, approximately 8 seconds, cycle control unit 30 energizes an electric motor or bidirectional air cylinder (not shown) to pivot vane 26 90° against an opposing pair of stops 40. Fresh air is now drawn through matrix 20, through ports D and A and into the duct 10 whereas heated air is drawn from duct 14 through ports B and C and caused to pass through matrix 18. The result is the transfer from matrix 18 to supply air of that sensible and latent heat stored in matrix 20 during the previous half cycle of operation. Similarly, the now cooled matrix 18 is heated by the air from exhaust duct 14. This cycle continues with the result that a very substantial volume of air may be caused to continuously pass in a constant uniform direction through the building for ventilation purposes while at the same time extremely high percentages; i.e., up to about 97%, of the sensible and latent thermal energy in the air is fully and continuously recovered. This recovery rate is especially significant in view of the aforementioned fact that the recovered thermal energy includes not only energy from primary heat sources but energy from secondary sources within the building as well. Moreover, the continuous movement of air through the building has the effect of relocating the heat in the thermally loaded air which has risen to the ceiling by bringing it back to the lower levels where it is needed for work or comfort. This relocation of heat (or cold) is accomplished in combination with the ventilation of the affected area by bringing in fresh outside air; i.e., heat relocation is not effected merely by circulating stale or contaminated air from the ceiling back to the lower levels. The net result is the substantial savings of fuel and heat costs, the increased comfort and safety in the working area and the continuous uniform ventilation of the building.

FIG. 1a shows an alternative to the arrangement of FIG. 1. In this arrangement, the exhaust duct 14 feeds into motor driven fan 16 and thence to a wet scrubber 32' the output port of which is connected to port B of housing 24. The wet scrubber is typically used where corrosive contaminants are contained in the exhaust air. A satisfactory wet scrubber is the "Cycle Mist Arrestor" made by S.C.H. Engineering, Inc. of Durand, Mich.

FIG. 2 illustrates the roof-top portion of a typical installation of the system of FIG. 1. Matrix 18 is disposed within an upright sheet metal housing 18' having side access doors 42 and a rain protected side port through which air is drawn and exhausted in a cyclical fashion as represented by the double-ended arrow. The second matrix is disposed within a sheet metal housing 20' having a similar rain protected side port and access doors. The housings 18' and 20' straddle the valve housing 24. Exhaust fan unit 16 is shown to comprise a sheet metal housing enclosing a turbine 44 which is driven by motor [46] *45* to draw air continuously from the exhaust duct 14 of FIG. 1. It is apparent that the supply duct 10 is directly opposite the exhaust duct 14 in the assembly of FIG. 2 and similarly comprises a turbine and motor drive system. The baffle of vane 26 is disposed centrally between the four housings and cyclically repositioned by means of the double-acting air cylinder 46 also shown in FIG. 2.

Referring now to FIG. 3, vane 26 is shown mounted on pivot 28 with rack arm 50 meshing with gear 52 on the vane pivot. Cushioned stops 40 are provided at the four corners of the housing 24 to stop the cyclical travel of the vane 26 and to provide a degree of sealing. Double-acting air cylinder 46 is connected through lines 54 to an air pressure source 56, the gating or valving of air pressure to the lines 54 being controlled by a timer unit 58. The timer 58 operates in response to signals from inside/outside air thermometer 60 to control the cycle time such that the higher the temperature gradient between inside and outside air, the shorter the reversing cycles of air movement. Timer 58 may comprise a simple clock mechanism such as a rotary wheel capable of generating a single pulse with each complete rotation, and the speed of rotation being subject to control by electronic thermostat unit 60. With each pulse from the rotating wheel of timer 58, a bistable device such as a flip-flop is toggled to provide actuating signals to the pressure source to reverse the pressure conditions in air lines 54. Alternative arrangements are, of course, useable.

The cylinder is operated by the timer with preset values for a given matrix design and required efficiency. Varying efficiency can be obtained by modifying the time base, e.g., for hot days and cold nights, a building may be cooled down by lengthening the night time cycle. When interior temperatures attain a good comfort level, the time base, i.e., dwell time, can again be lengthened to match heat recovery efficiency to temperature requirements.

FIG. 3 also provides a convenient chart showing the functions of the ports A, B, C and D of the housing 24 during alternate half cycles of operation.

Referring now to FIG. 4, a matrix cartridge 18a is shown mounted in place between opposing structural walls 62 and 64 of a housing such as 18' of FIG. 2. The matrix comprises a section of expanded paper honeycomb material of a type which may be obtained by any of a variety of commercial sources including, for example, the Union Camp Corporation of Kalamazoo, Mich. The material is a fibrous organic material made from vegetable biproducts and pressed into sheet form, cut and glued into the expandable accordian-like construction which characterizes expandable honeycomb structures. Matrix 18a may further be coated with a phenolic or other resin for durability, stiffness, and structural integrity as well as to withstand cleaning by steam or spray as described herein. Such a matrix material has been found to possess the high specific heat of 0.35, the geometric characteristics of parallel flow paths, low pressure drop, low fouling, high heat transfer, small hydraulic diameters, and adequate conductivity to be useful in the illustrated environment to exchange large quantities of latent and sensible heat on alternate half cycles of operation as described. Though the term "coated" is used to describe the relationship between paper and resin, it is to be understood that some degree of impregnation results. In practice, resin to paper ratios of from four to twenty percent have been found satisfactory.

Matrix cartridge 18a is fabricated into rigid self-contained assemblies which can be easily installed and removed through the side access doors shown in FIG. 2. A representative cartridge comprises at the opposite ends thereof stiffner plates 66 and 68 of wood, plastic, or other suitable material and arranged in planes which are parallel to the flow axis as indicated by the arrow in FIG. 4. Plate 66 is secured to wall 62 of the matrix housing whereas plate 68 is slidably mounted on guide rods 70 and 72 which span the distance between the walls 62 and 64 of the housing as shown. Plate 68 is connected to an elongated screw 74 which extends through a three-sided channel member 76 having sections 78 which extend transversely of the air flow path to act as guides for the external surfaces of cartridge 18a.

In operation the cartridge 18a of FIG. 4 is installed in a semi-expanded condition as shown in FIG. 4; i.e., the expandable honeycomb paper cartridge 18a is expanded to only approximately 300% of its fully compressed dimension laterally of the flow path. Channel member 76 extends fully between the two walls of the air flow housing which are normal to the plane of the paper in FIG. 4 thus to prevent any air flow around the matrix material. As the matrix becomes clogged or loaded with solid matter, the screw 74 may be turned to more fully expand the matrix material thereby to provide increased flow area and reduced pressure drop over the expected life of the cartridge 18a.

In addition, the use of the flexible, expandable honeycomb paper material in cartridge form as shown in FIG. 4 permits occassional impact type cleaning of the matrix cartridge 18a in much the same manner as one cleans a carpet or rug by beating it. In other words, the nut on screw 74 may be loosened and the cartridge 18a may be thereafter violently compressed and re-expanded to shake dust and other solid particles loose from the matrix material. This cleaning operation may be periodically reapplied to substantially expand the life of the matrix material. It can be seen that such an operation is absolutely impossible with rigid matrix materials such as metal and ceramic. In addition, the relatively inexpensive nature of the fibrous organic matrix material permits it to be periodically discarded while retaining the substantial economic benefits of energy reclamation.

The subject invention is particularly applicable to process applications where, for example, air from a hot wash is exhausted and fresh air for the surrounding area is supplied. In such a system the scrubber unit 32 yields water of substantially elevated temperature which may be reclaimed and directed back to a rinse vat or the like for further savings.

FIG. 5 depicts on the left side the temperature gradient across a matrix for winter and summer conditions.

In each case, the matrix inner face is brought to the inside temperature of approximately 70° F. On the right, FIG. 5 shows the energy absorption and desorption of the same matrix.

FIG. 6 shows the relationship between inside and outside air temperatures for a ventilation system embodying the invention and set for eight second half-cycles.

It is to be understood that the invention has been described with reference to specific embodiments which provide the features and advantages previously described and that such specific embodiments are susceptible of modification as will be apparent to those skilled in the art. Accordingly, the foregoing description is not to be construed in a limiting sense.

For example, the embodiment of FIGS. 1 and 1a may be readily adapted for all-season use by the addition of a cooling coil to the supply duct to air-condition during warm weather months. Such a coil may be activated by conventional or solar air-conditioning systems, the matrices being effective to recover the thermal energy, in this case, represented by cooling, from the exhausted air.

The embodiments of the invention in which an exclusive property or privilege is claimed are defined as follows:

1. A forced air, non-recirculating ventilation system for an enclosure in which a thermal energy gradient relative to outside ambient air temperature has been produced by the expenditure of energy, said system comprising:

first means defining a distribution duct [from an outside air source to] *having an inner end positioned within* said enclosure *and an outer end;* first air-flow-forcing means operatively associated with said [first] *distribution* duct for producing a substantially continuous, unidirectional flow of substantially exclusively outside air to said enclosure *through said distribution duct;* second means defining an exhaust duct [from] *having an inner end positioned in* said enclosure [to the outside air source] *and an outer end;* second air-flow-forcing means operatively associated with said [second] *exhaust* duct for producing a substantially continuous, unidirectional flow of inside air from said enclosure substantially completely to the outside *of said enclosure through said exhaust duct;* first and second matrices of thermal energy absorbing material, each being characterized by a high surface area to volume ratio and low hydraulic resistance;

[housing means for said] *first and second matrix housings respectively receiving said first and second* matrices [and arranged for air flow therethrough, to and from outside air *and each defining an inlet opening and a discharge opening on opposite sides of the respective matrix positioned therewithin;* and valve means connecting said [housing means] *matrix housings* to said [first and second duct means] *distribution and exhaust ducts* for alternately reversely hydraulically connecting the [duct means] *ducts* to respective matrices thereby to draw outside air into said enclosure to ventilate same through one matrix while complementally exhausting inside air from said enclosure through the other matrix*;*

*said valve means including:*

*a valve housing for said valve means positioned centrally between said matrix housings and said outer ends of said ducts with said inlet openings of said matrix housings and said outer ends of said ducts circumferentially arrayed about said valve housing, said valve housing having four ports arranged in opposite pairs, the ports of one opposite pair being connected to respective inlet openings of said matrix housings and the ports of the other opposite pair being respectively connected to the outer ends of said exhaust and distribution ducts; and*

*an air flow regulation means comprising a partition in the form of a rigid vane rotatably mounted within said valve housing, and means for driving said vane between two alternate positions for intermittently making said alternate reverse hydraulic connections.*

2. An apparatus as defined in claim 1 wherein each matrix comprises a resiliently expandable volume of fibrous organic material defining plural parallel channels.

3. An apparatus as defined in claim 2 wherein the material is paper.

4. An apparatus as defined in claim 3 wherein the paper is coated with a resinous material.

5. An apparatus as defined in claim 2 wherein each matrix further comprises means for variably expanding said expandable volume thereby to regulate flow volume.

6. Apparatus as defined in claim 1 including burner means in said exhaust duct.

7. Apparatus as defined in claim 1 further including control means for cyclically operating said valve means between first and second positions for accomplishing said alternate, reverse hydraulic connections at a rate related to the thermal energy absorption capability of said matrices.

[8. Apparatus as defined in claim 1 wherein said valve means comprises a valve housing and a rotatable partition disposed within said valve housing.]

* * * * *